(12) United States Patent
Loughman et al.

(10) Patent No.: US 10,830,482 B2
(45) Date of Patent: Nov. 10, 2020

(54) HVAC CABLE GROUNDING SYSTEMS AND METHODS

(71) Applicant: Johnson Controls Technology Company, Auburn Hills, MI (US)

(72) Inventors: Brian Loughman, York, PA (US); Nicholas S. Cummings, York Haven, PA (US); Marcel P. Ferrere, Jr., Dalmatia, PA (US); Aron M. Seiler, Freeland, MD (US); Earl J. Rightmier, Marcy, NY (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/259,900

(22) Filed: Jan. 28, 2019

(65) Prior Publication Data

US 2020/0217549 A1    Jul. 9, 2020

Related U.S. Application Data

(60) Provisional application No. 62/788,050, filed on Jan. 3, 2019.

(51) Int. Cl.
*F24F 11/88* (2018.01)
*F24F 11/89* (2018.01)
*H02G 15/105* (2006.01)
*H01R 13/6582* (2011.01)
*F24F 11/70* (2018.01)

(52) U.S. Cl.
CPC ............. *F24F 11/88* (2018.01); *F24F 11/70* (2018.01); *F24F 11/89* (2018.01); *H01R 13/6582* (2013.01); *H02G 15/1055* (2013.01)

(58) Field of Classification Search
CPC .... H01R 4/646; H01R 12/775; H01R 13/658; H01R 13/65802; H01R 13/6592; H01R 13/6593; H01R 23/662; H02G 15/1055; F24F 11/88; F24F 11/89; F24F 11/70
USPC ............ 439/98, 497, 607.41–607.43, 607.45
See application file for complete search history.

(56) References Cited

U.S. PATENT DOCUMENTS

| | | | | |
|---|---|---|---|---|
| 4,257,658 A | * | 3/1981 | Hammond | H01R 4/646 174/78 |
| 4,405,187 A | * | 9/1983 | Muller | H01R 13/6589 439/607.05 |
| 4,674,822 A | * | 6/1987 | Hall | H01R 4/2404 174/36 |
| 4,738,638 A | * | 4/1988 | Bogese, II | H01R 13/6597 439/607.43 |

(Continued)

*Primary Examiner* — Gary F Paumen
(74) *Attorney, Agent, or Firm* — Fletcher Yoder, P.C.

(57) ABSTRACT

The present disclosure relates to a communication cable for a heating, ventilation, and/or air conditioning (HVAC) system having a set of conductors extending between a first end of the communication cable and a second end of the communication cable, and a cable shield surrounding the plurality of conductors. The cable shield has a first shield connector at the first end of the communication cable and a second shield connector at the second end of the communication cable. The first end is configured to couple to a first controller of the HVAC system, the second end is configured to couple to a second controller of the HVAC system, and the cable shield is configured to electrically couple to a single electrical ground point via one or both of the first and second shield connectors.

22 Claims, 6 Drawing Sheets

(56) References Cited

U.S. PATENT DOCUMENTS

| | | | | | |
|---|---|---|---|---|---|
| 5,473,117 | A | * | 12/1995 | Morgan | H01R 4/646 174/74 R |
| 5,597,314 | A | * | 1/1997 | Auclair | H01R 4/363 439/793 |
| 5,631,444 | A | * | 5/1997 | Rook | H01R 4/646 174/78 |
| 5,681,172 | A | * | 10/1997 | Moldenhauer | H01R 9/032 439/95 |
| 5,722,841 | A | * | 3/1998 | Wright | H01R 4/646 174/78 |
| 5,775,924 | A | * | 7/1998 | Miskin | H01R 9/034 439/98 |
| 6,162,086 | A | * | 12/2000 | Kuo | H01R 13/6582 439/497 |
| 7,892,001 | B2 | * | 2/2011 | Hanyu | H01R 23/68 439/247 |
| 2002/0048994 | A1 | * | 4/2002 | Oota | H01R 9/24 439/98 |
| 2008/0287005 | A1 | * | 11/2008 | Kameda | G06F 1/184 439/498 |
| 2013/0203283 | A1 | * | 8/2013 | Tai | H01R 12/592 439/404 |
| 2014/0065876 | A1 | * | 3/2014 | Van Tilburg | H01R 9/032 439/502 |
| 2015/0079845 | A1 | * | 3/2015 | Wanha | H01R 13/6477 439/607.41 |

* cited by examiner

HVAC CABLE GROUNDING SYSTEMS AND METHODS

CROSS REFERENCE TO RELATED APPLICATIONS

This application claims priority from and the benefit of U.S. Provisional Application Ser. No. 62/788,050, entitled "HVAC CABLE GROUNDING SYSTEMS AND METHODS," filed Jan. 3, 2019, which is hereby incorporated by reference in its entirety for all purposes.

BACKGROUND

The present disclosure relates generally to heating, ventilation, and/or air conditioning (HVAC) systems. Specifically, the present disclosure relates to grounding communication cables in HVAC systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A wide range of applications exist for HVAC systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide a desired temperature in a controlled space, typically the inside of a residence or building. Similar systems are used for vehicle heating and cooling, as well as for general refrigeration. In many HVAC systems, electrical cables, such as communication cables coupled between components of the HVAC system, are susceptible to signal interference or electrical noise.

SUMMARY

The present disclosure relates to a communication cable for a heating, ventilation, and/or air conditioning (HVAC) system having a set of conductors extending between a first end of the communication cable and a second end of the communication cable, and a cable shield surrounding the plurality of conductors. The cable shield has a first shield connector at the first end of the communication cable and a second shield connector at the second end of the communication cable. The first end is configured to couple to a first controller of the HVAC system, the second end is configured to couple to a second controller of the HVAC system, and the cable shield is configured to electrically couple to a single electrical ground point via one or both of the first and second shield connectors.

The present disclosure also relates to a control system for a heating, ventilation, and/or air conditioning (HVAC) system including a controller having a first port and a second port, and a first communication cable having a first plurality of conductors coupled to a first connector of the first communication cable and having a first cable shield surrounding the first plurality of conductors. The first cable shield has a first shield connector. The HVAC system further includes a second communication cable having a second plurality of conductors coupled to a second connector of the second communication cable and having a second cable shield surrounding the second plurality of conductors. The second cable shield has a second shield connector. The first connector is coupled to the first port, the second connector is coupled to the second port, and the first and second shield connectors are coupled to one another.

The present disclosure further relates to a control system for a heating, ventilation, and/or air conditioning (HVAC) system having a set of communication cables. Each communication cable of the set of communication cables includes a set of conductors extending between a first connector and a second connector and includes a cable shield surrounding the plurality of conductors and extending between a first shield connector and a second shield connector separate from the first and second connectors. The first and second connectors are each configured to couple to a respective controller port, and the first and second shield connectors are each configured to couple to a respective shield connector of another communication cable of the plurality of communication cables.

DETAILED DESCRIPTION

The present disclosure is directed to systems and methods for a common point grounding between control boards of heating, ventilation, and/or air conditioning (HVAC) systems. In some instances, electrical cables, such as communication cables, coupled between control boards of an HVAC system may be affected by noise or electrical interference, such as undesirable variations in current or voltage, which may distort electrical signals passing through the communication cables. In some instances, the noise may be corrected through signal conditioning, such as software processing and/or filtering. However, signal conditioning may be difficult to design, tailor, and/or implement effectively due to unexpected fluctuations in electrical noise.

Accordingly, provided herein is a system configured to block and/or divert electrical interferences from affecting electrical signals within the communication cables. For example, within a control panel, multiple control boards, such as printed circuit boards (PCBs), may be communicatively coupled together via one or more electrical and/or communication cables. Each of the cables may include one or more individual conductors that are electrically insulated from each other, such as through the use of a rubber or plastic wrapping, coating, or sleeve. These individual conductors may be susceptible to signal distortion from electrical noise or interference. Accordingly, the cables may include a shield, such as a faraday shield, disposed about and along a length of the conductors. The shield may be a conductive mesh enclosure configured to dissipate, block, or reflect electromagnetic radiation, thereby preventing the electromagnetic radiation from adversely affecting electrical signals within the conductors.

The shield is also electrically coupled to a ground. Particularly, the respective shield of each of the communication cables may be serially connected together. An end of the serial connection may be grounded to a conductive surface, such as a piece of sheet metal, of the control panel. In this manner, each of the communication cables connecting the control boards may share a common ground point. That is, the electrical noise of each of the shields may be dissipated through the common ground point. In this manner, a ground loop, such as unwanted voltage potentials between multiple ground points, may be avoided.

Figure 1:
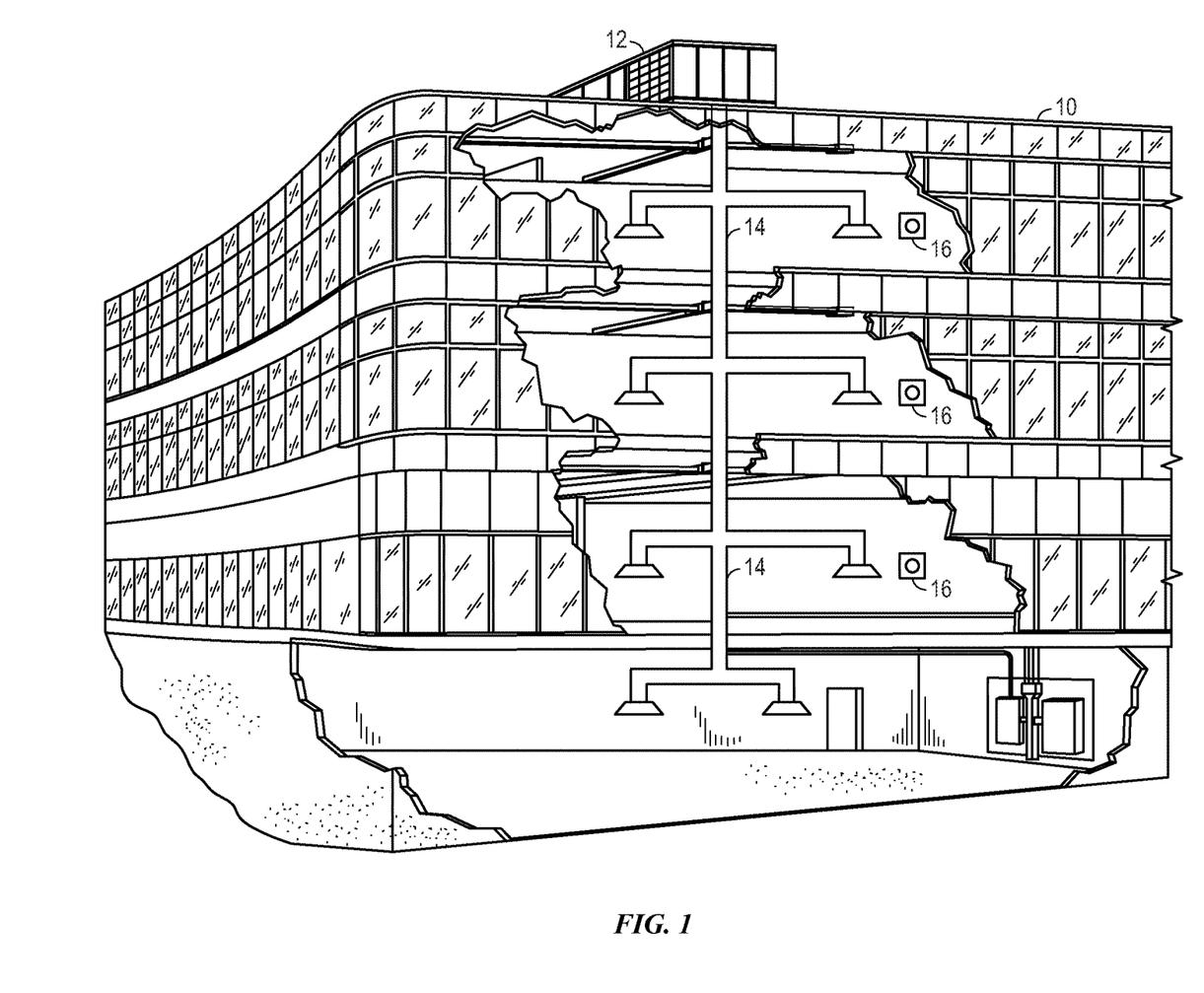
FIG. 1 is a perspective view of an embodiment of a heating, ventilation, and/or air conditioning (HVAC) system for building environmental management that may employ one or more HVAC units, in accordance with aspects of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56. The HVAC unit 12 is an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
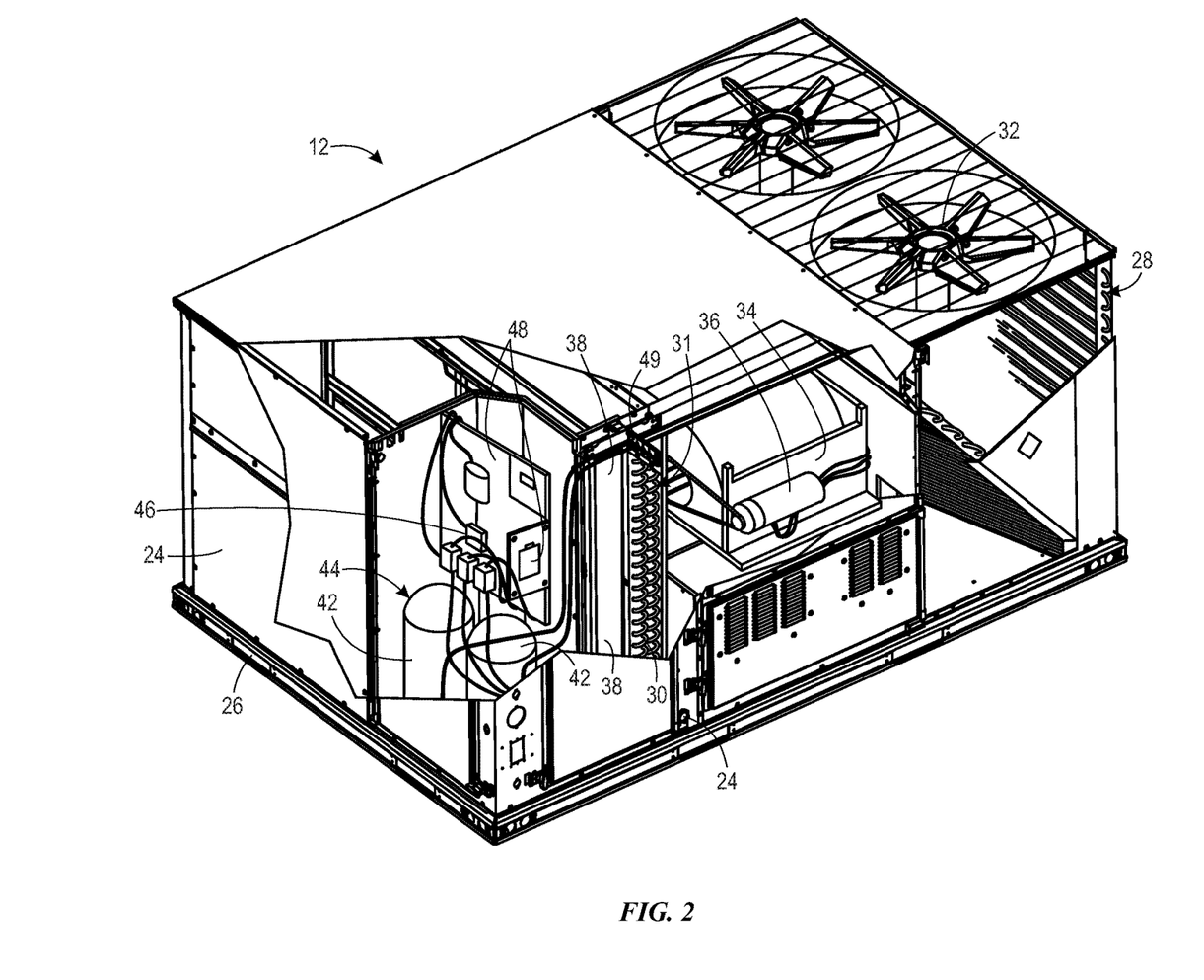
FIG. 2 is a perspective view of an embodiment of an HVAC unit that may be used in the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the airflows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
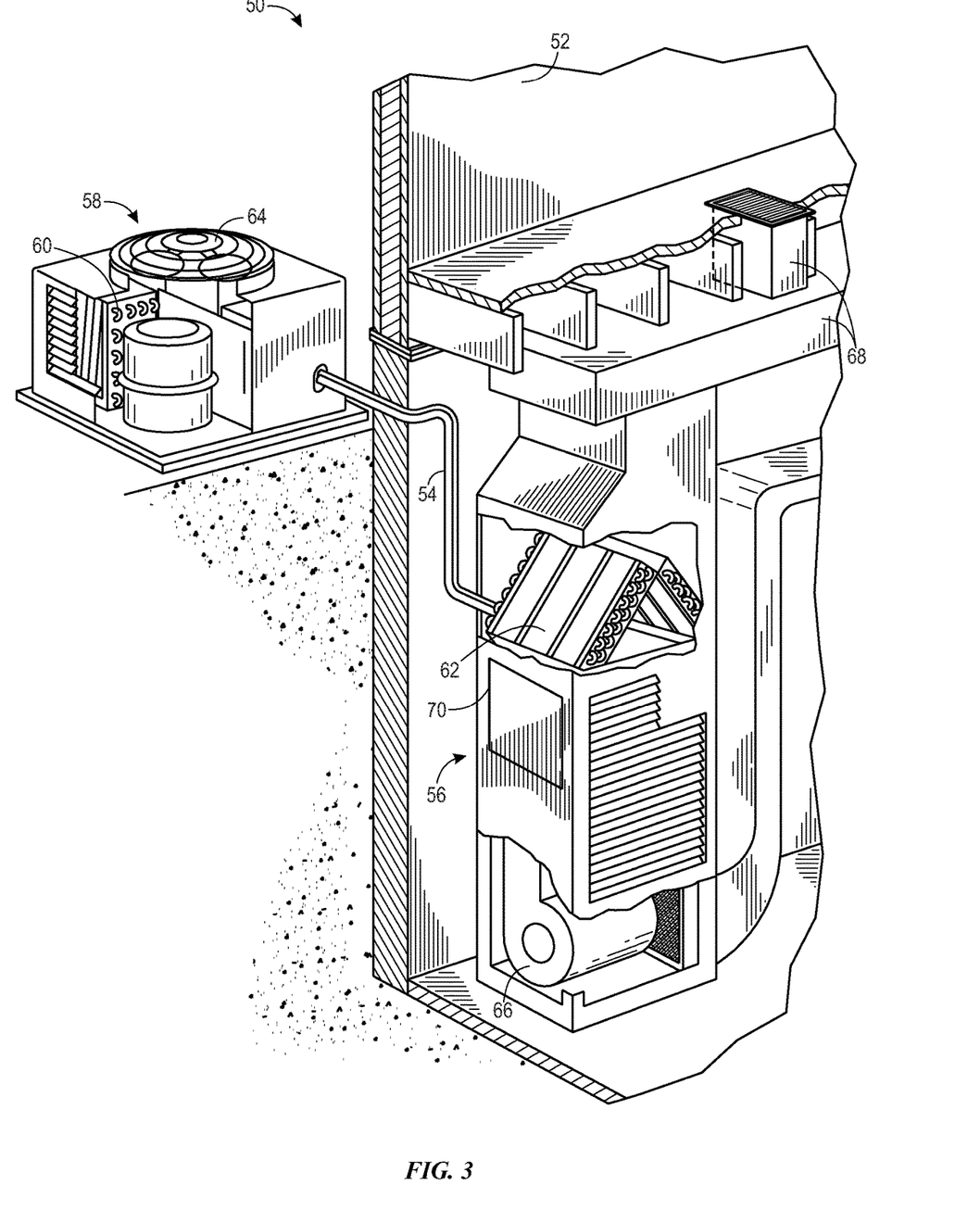
FIG. 3 is a perspective view of an embodiment of a residential, split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
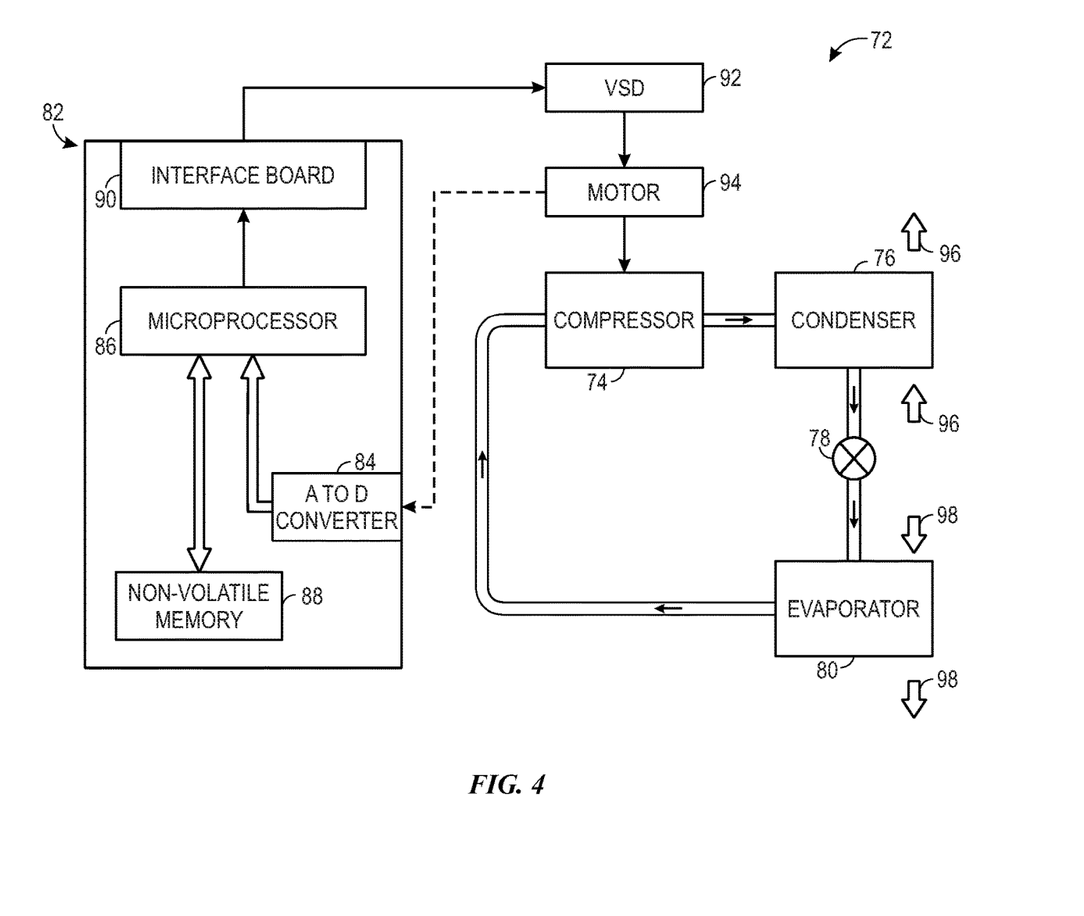
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, a heating, ventilation, and/or air conditioning (HVAC) system 100, such as the HVAC unit 12, the residential heating and cooling system 50, and/or the vapor compression system 72, may include multiple control boards communicatively coupled with communication cables. The communication cables may include individual shields configured to serially connect with one another and couple to a common ground point.

Figure 5:
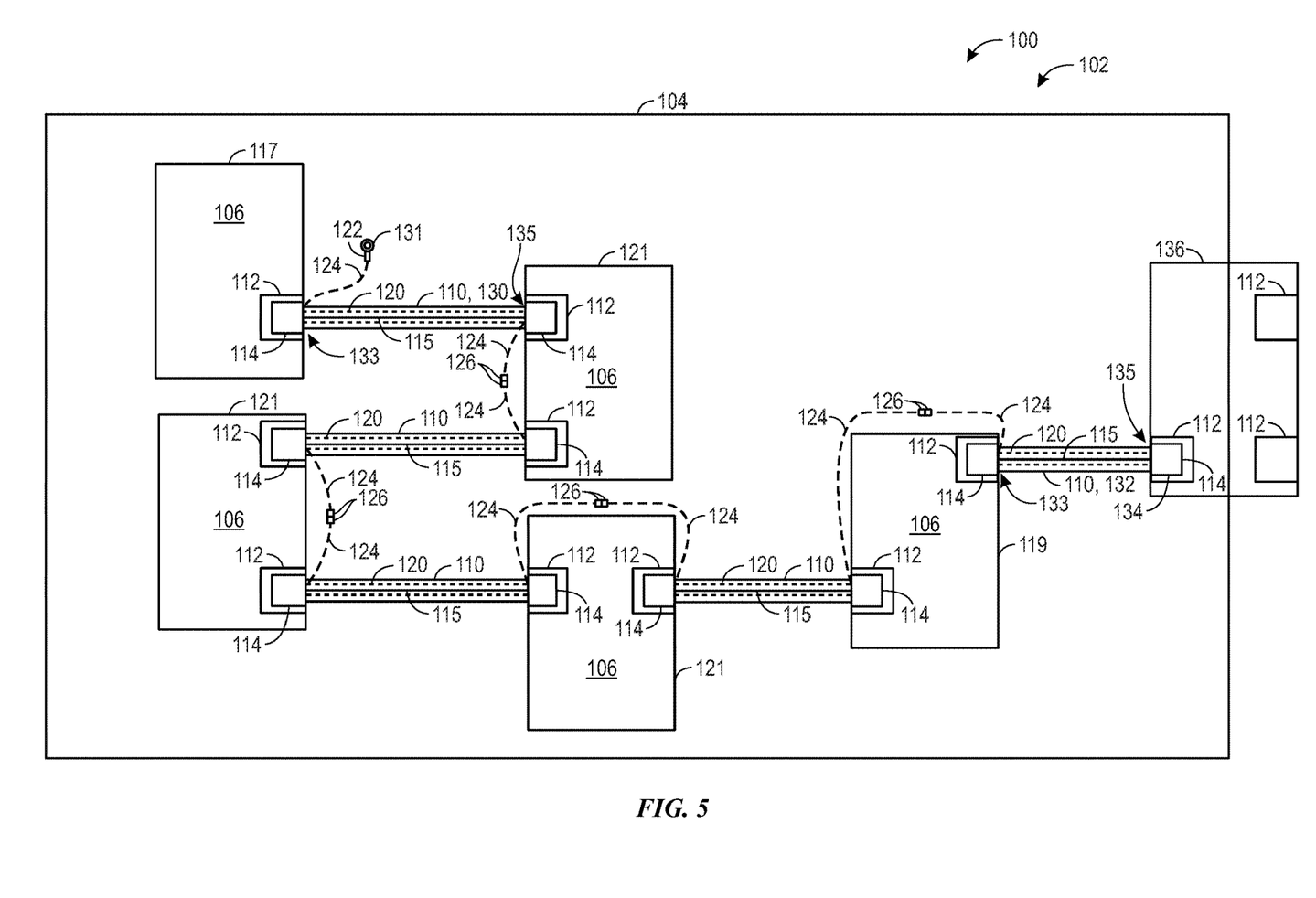
FIG. 5 is a schematic view of an embodiment of a control panel of an HVAC system, in accordance with aspects of the present disclosure.

Keeping this in mind, FIG. 5 is a schematic view of an embodiment of a control panel 102, such as the control panel 82 and/or the control board 48, of the HVAC system 100. Particularly, the control panel 102 may include an enclosure 104 or housing configured to house multiple control boards 106 or controllers, such as printed circuit boards (PCBs). As discussed above in regard to the control panel 82 and the control board 48, the control panel 102 is configured to control various functions of the HVAC system 100. For example, the control panel 102 may be communicatively coupled to other components of the HVAC system 100, such as thermostats, sensors, alarms, valves, compressor(s), motors, fans, switches, and so forth. Accordingly, the control panel 102 is configured to regulate operation of the HVAC system 100 by providing alarms, monitoring safety switches, controlling climate characteristics of a conditioned space serviced by the HVAC system 100, and so forth.

The control boards 106 are communicatively coupled together in series within the control panel 102. Particularly, the control panel 102 may include communication cables 110 communicatively coupling the control boards 106. For example, each control board 106 may include one or more ports 112 configured to receive a connector 114, such as a plug, of one of the communication cables 110. As discussed in further detail below, the communication cables 110 may include one more conductors 115 configured to transfer electrical signals along the communication cables 110 and between the control boards 106 coupled by the communication cables 110. In some embodiments, the connector 114 may be a 3-pin connector configured to route signals of three separate conductors 115 within the communication cable 110. However, it is to be understood that other embodiments of the communication cable 110 may include any suitable number of individual conductors 115 with any suitably-sized pin connector 114.

In certain embodiments, each control board 106 may include one or more ports 112. For example, each control board 106 may include two ports 112, such that one of the ports 112 is configured to receive data from one control board 106, or other source, and one of the ports 112 is configured to output data to another control board 106, or other source. In some embodiments, however, the control boards 106 may be configured to receive and output data from any one port 112. As shown, in the serial connection of the control boards 106, a first control board 117 and a last control board 119 may each be coupled to one another via intermediate control boards 121 and communication cables 110. Along this line, the intermediate control boards 121 in the serial connection between the first and last control boards 117, 119, may each be connected to two other control boards 106 via one or more of the communication cables 110.

Further, as discussed herein, the communication cables 110 may be exposed to electromagnetic interference, which has potential to induce unwanted electrical currents, such as noise, within the communication cables 110. For example, electromagnetic interference may be caused by power lines, radio frequency (RF) transmitters, nearby conductors, ignition systems, motors, and so forth. Accordingly, the communication cables 110 include respective shields 120 or shield portions configured to block or prevent electromagnetic interference from affecting signals traveling within the conductors 115 of the communication cables 110. For example, the shield 120 may be conductive mesh lining disposed about the one or more conductors 115 and may be configured to act as a Faraday shield for the conductors 115. That is, the shield 120 may include a woven conductive material configured to conduct external electromagnetic interference or charges, such that the electromagnetic interference is blocked or prevented from passing to an interior of the shield 120, such as a space surrounded by the shield 120 and through which the conductors 115 extend. In other words, the shield 120 blocks or prevents exterior electromagnetic radiation from influencing a signal passing through the conductors 115 within an interior space of the shield 120.

The shields 120 of the communication cables 110 are connected to a common ground point 122 of the control panel 102 or other part of the HVAC system 100. To illustrate, at each respective end of the communication cables 110, the shield 120 may include an extension 124 or extension portion, such as a conductive extension or cable, protruding or extending from the communication cable 110. Indeed, the extension 124 may extend from the communication cable 110 adjacent to the connectors 114 at ends of the communication cable 110. In some embodiments, the shield 120 may extend along a length of the communication cable 110 such that the conductors 115 within the communication cable 110 are substantially surrounded or encircled by the shield 120 along the length, such as the entire length, of the communication cable 110. The shields 120 of the communication cables 110 may be serially connected together via shield connectors 126, such as terminals, disposed at ends of the extensions 124. In this manner, the shields 120 of the communication cables 110 are serially electrically coupled to one another and are connected to the common ground point 122, which is a single ground point for all of the communication cables 110.

In order to couple to one another, the shield connectors 126 of the shields 120 may have coupling features configured to engage with one another. For example, in some embodiments, each shield connector 126 may include either a female or a male type quick-connect terminal or connector. For example, the shield 120 of each communication cable 110 may include one female type quick-connect shield connector 126 disposed at one end of the communication cable 110 and one male type quick-connect shield connector 126 disposed at another end of the communication cable 110. As used herein, a quick-connect connection may be defined as a coupling implemented without the use of tools, such as by a press fit, screwing, clips, tabs, latches, or any other suitable engagement mechanism that may be actuated without additional tools. In some embodiments, the shield connectors 126 may be universal or standardized types of connectors, such that the communication cables 110 may be interchanged with one another. In this manner, the shields 120 of each of the communication cables 110 may easily be serially connected to one other, as shown. While the conductors 115 of the communication cables 110 may couple directly to ports 112 of control boards 106, the shields 120 of the communication cables 110 may couple directly to shields 120 of other communication cables 110. In this way, electrical connections between the conductors 115 of the communication cables 110 and the control boards 106 remain separate and/or isolated from electrical connections between the shields 120 of the communication cables 110 and the ground point 122.

As mentioned above, the serial connection of the shields 120 of the communication cables 110 may terminate at the ground point 122, which is a single or common ground point for all of the communication cables 110. This configuration reduces the probability of a ground loop being created. In some embodiments, the ground point 122 may be a connection point on an interior side of the control panel 102, such as a piece of sheet metal of the enclosure 104 of the control panel 102. In the illustrated embodiment, the shield 120 of a first communication cable 130 of the communication cables 110 is coupled directly to the ground point 122 and may be considered a beginning of the serial connection of the shields 120. Similarly, the shield 120 of a last communication cable 132 of the communication cables 110 may be considered an end of the serial connection of the shields 120 of the illustrated communication cables 110. Indeed, the shield extension 124 of a first end 133 of the first communication cable 130 may not couple to the shield extensions 124 of another communication cable 110 and instead may couple to the ground point 122. Conversely, the shield extension 124 of a second end 135 of the first communication cable 130 may be coupled to the shield extension 124 of another communication cable 110. In some embodiments, the ground point 122 may include a ring terminal 131 coupled to the ground point 122 on the enclosure 104. That is, the shield extension 124 of the shield 120 of the first end 133 of the first communication cable 130 may be coupled to the ring terminal 131, which may be coupled to the enclosure 104, such as via a screw or welding. However, it is to be understood that the shield extension 124 of the first end 133 of the first communication cable 130 may be coupled to the ground point 122 through any suitable connection configuration to transfer electrical current from the shield 120 of the first communication cable 130 to the ground point 122. In this way, electromagnetic fields external to the conductors 115 of the communication cables 110 may be blocked from interfering with the electrical signals carried by the conductors 115 by dissipating any electromagnetic interference through the ground point 122.

In some embodiments, the shield extension 124 of the shield 120 of the second end 135 of the last communication cable 132 may be left disconnected. For example, in such embodiments, the shield extension 124 of the second end 135 of the last communication cable 132 may be folded against external insulation of the last communication cable 132 and held against the external insulation, such as via a zip-tie. Further, in some embodiments, the shield 120 of the last communication cable 132 may be coupled to the connector 114 in parallel with the conductors 115 at the second end 135 of the last communication cable 132. For example, in such embodiments, the last communication cable 132 may terminate with a 4 pin connector 134 at the second end 135 of the last communication cable 11. The 4 pin connector 134 is configured to house endings of three conductors 115 and the extension 124 of the shield 120. In some embodiments, the connector 114 of the last communication cable 132 may be plugged into the port 112 of a bulkhead connector 136. The bulkhead connector 136 may function as a communication bus and may facilitate transfer of signals from the conductors 115 of the communication cables 110 to other portions of the HVAC system 100. Similarly, the ground potential of the ground point 122 may be transferred through the pin connector 134 and may be extended to other portions of the HVAC system 100 via the bulkhead connector 136.

Figure 6:
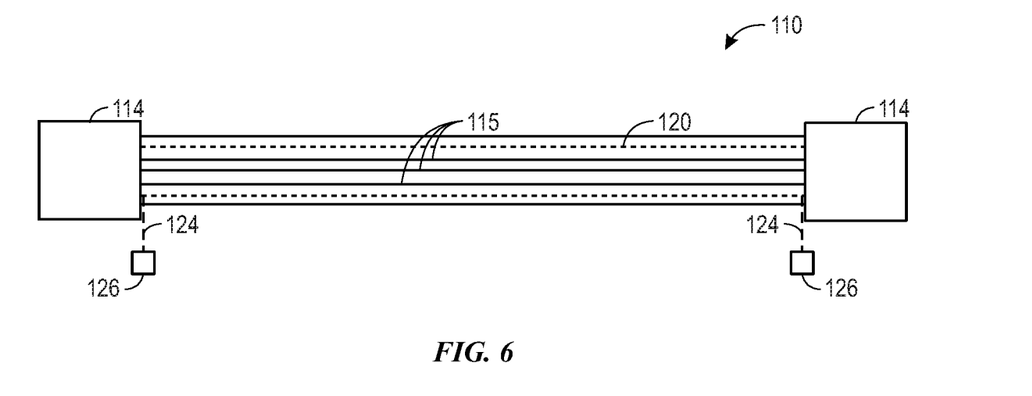
FIG. 6 is a schematic side view of an embodiment of a communication cable that may be used with the control panel of FIG. 5, in accordance with aspects of the present disclosure.
Figure 7:
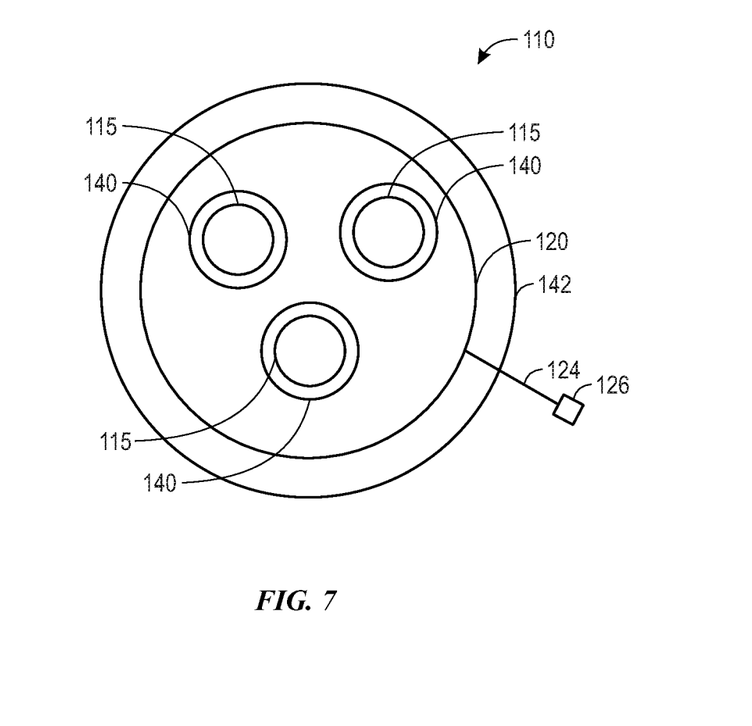
FIG. 7 is a schematic axial view of an embodiment of a communication cable that may be used with the control panel of FIG. 5, in accordance with aspects of the present disclosure.

FIGS. 6 and 7 are schematic views of embodiments of the communication cable 110 and are discussed in parallel below. Specifically, FIG. 6 is a schematic side section view of the communication cable 110, and FIG. 7 is a schematic axial section view of the communication cable 110.

As shown, the communication cable 110 includes the one or more conductors 115 disposed within the shield 120. In other words, the shield 120 surrounds or encircles the conductors 115 of the communication cable. Specifically, in the current embodiment, the communication cable 110 includes three individually-insulated conductors 115. That is, each conductor 115 may include conductor insulation 140 disposed around a respective conductor 115 along a length of the conductor 115, where the conductor insulation 140 is configured to electrically insulate the separate conductors 115 from each other and from the shield 120. The conductor insulation 140 may be, for example, a rubber or plastic wrapping, coating, or sleeve disposed about the respective conductors 115. The shield 120 surrounds the conductors 115 along the length of the conductors 115 within the communication cable 110. The communication cable 110 may further include external insulation 142 configured to externally surround the shield 120. Similar to the conductor insulation 140, the external insulation 142 may be, for example, a rubber or plastic wrapping, coating, or sleeve disposed about the shield 120. As shown, the shield 120 is disposed radially between the conductors 115 and the external insulation 142 relative to a longitudinal axis of the communication cable 110.

The conductors 115 may extend along the length of the communication cable 110 and terminate at the connectors 114, such as a 3 pin connector, at opposite ends of the communication cable 110. The shield 120 may also extend the length of the communication cable 110 and may be conductively coupled, such as electrically or communicatively coupled, to the extensions 124 at opposite ends of the communication cable 110. Indeed, in some embodiments, as discussed above, the shield 120 may be a metallic woven mesh material or structure. Accordingly, the metallic woven mesh material may be formed into the extensions 124 at the opposite ends of the communication cable 110. In some embodiments, the extensions 124 may be any suitable type of conductor that is electrically insulated from the conductors 115 and conductively coupled to the shield 120.

The extensions 124 may terminate at the shield connectors 126. As discussed above, the shield connectors 126 may include quick-connect mechanisms that enable shield connectors 126 of different communication cables 110 to easily couple to each other. Particularly, each communication cable 110 may include a female quick-connect shield connector 126 at a first end of the communication cable 110 and a male quick-connect shield connector 126 at a second end of the communication cable 110. In this manner, a male quick-connect shield connector 126 of each communication cable 110 may couple to a female quick-connect shield connector 126 of another communication cable 110 to form the serial connection between the respective shields 120 of the communication cables 110. In other words, each shield 120 of each communication cable 110 may include a first type of connector and a second type of connector, wherein the first type of connector is configured to couple to the second type of connector without the use of tools, such as by a press fit.

Each of the communication cables 110 may be self-similar. For example, each communication cable 110 may include the same number of conductors 115 and may include the shield 120 extending along the length of the communication cable 110. Further, each communication cable 110 may include the connectors 114 and the shield connectors 126, which may be of a universal or standardized type or configuration. In other words, the connectors 114 of the communication cables 110 may be self-similar and the shield connectors 126 may also be self-similar. However, it should be appreciated that, while the components of each communication cable 110 may be similar and/or standardized, respective lengths of the communication cables 110 may vary. In this manner, communication cables 110 may be used interchangeably to communicatively couple all of the control boards 106 of the control panel 102 in a serial connection, thereby increasing installation efficiency of the control panel 102.

However, as discussed above, in some embodiments, one of the communication cables 110, such as the first communication cable 130, may include the shield connector 126 at the second end 135 of the communication cable 110 and may not include the shield connector 126 at the first end 133 of the communication cable 110. Indeed, the shield 120 of the first communication cable 130 may be coupled to the ground point 122 via the extension 124 at the first end 133 of the communication cable 110. In some embodiments, the first communication cable 130 may be manufactured similar to each of the other communication cables 110 and may be altered post-manufacturing to remove the shield connector 126 at the first end 133 to connect the shield 120 of the first communication cable 130 to the ground point 122. Further, in some embodiments, all of the communication cables 110 may be self-similar except for the last communication cable 132. Indeed, as discussed above, in some embodiments, the connector 114 of the second end 135 of the last communication cable 132 may include the 4 pin connector 134 that incorporates the ground voltage of the shield 120 in the 4 pin connector 134. In some embodiments, the connector 114 of the second end 135 the last communication cable 132 may be coupled to the bulkhead connector 136.

Accordingly, the present disclosure is directed to an HVAC system having control boards of a control panel communicatively coupled in series via shielded communication cables. Shields of the communication cables may also be serially connected to each other, such that any electromagnetic interference within the shields is serially connected to a single grounding point on the enclosure of the control panel or other conductive portion of the HVAC system 100. In this manner, the shields of the communication cables block electromagnetic interference, such as signal noise, from affecting electrical signals carried by conductors within the communication cables. The single grounding point of the shields of the communication cables is particularly advantageous over systems with multiple grounding points because creation of a ground loop, which may cause interference in signals carried by the conductors of the communication cables, is avoided.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A communication cable for a heating, ventilation, and/or air conditioning (HVAC) system, comprising:
    a plurality of conductors extending between a first connector at a first end of the communication cable and a second connector at a second end of the communication cable; and
    a cable shield surrounding the plurality of conductors;
    a first shield connector external to the first connector at the first end of the communication cable and a second shield connector external to the second connector at the second end of the communication cable, wherein the first shield connector, the second shield connector, or both are configured to electrically couple and mechanically engage with an additional shield connector of an additional communication cable,
    wherein the first connector is configured to couple to a first controller of the HVAC system, the second connector is configured to couple to a second controller of the HVAC system, the cable shield is configured to electrically couple to a single electrical ground point electrically isolated from the first controller and the second controller via one or both of the first and second shield connectors to dissipate electromagnetic interference through the single electrical ground point, and the first shield connector and the second shield connector each extend outwardly from the communication cable via a respective flexible shield extension.

2. The communication cable of claim 1, wherein the cable shield includes a metallic woven mesh structure encircling the plurality of conductors.

3. The communication cable of claim 1, wherein each conductor of the plurality of conductors includes a respective insulator encircling the conductor and extending along a length of the conductor.

4. The communication cable of claim 3, wherein each conductor of the plurality of conductors and the respective insulator of each conductor are disposed within the cable shield of the communication cable.

5. The communication cable of claim 4, comprising an additional insulator disposed external to the cable shield.

6. The communication cable of claim 1, wherein the first shield connector is a first connector type, and the second shield connector is a second connector type, wherein the first connector type is different than the second connector type.

7. The communication cable of claim 6, wherein the first connector type is configured to electrically couple to the second connector type.

8. The communication cable of claim 1, wherein the plurality of conductors includes three individually electrically insulated conductors.

9. The communication cable of claim 1, wherein the first connector is a first 3-pin connector at the first end of the communication cable and the second connector is a second 3-pin connector at the second end of the communication cable, wherein the plurality of conductors is coupled to and extends between the first 3-pin conductor and the second 3-pin conductor.

10. The communication cable of claim 1, wherein the plurality of conductors extends between and is electrically coupled to the first connector and the second connector, and wherein the first connector and the second connector are similar to one another.

11. A control system for a heating, ventilation, and/or air conditioning (HVAC) system, comprising:
    a controller having a first port and a second port;
    a first communication cable having a first plurality of conductors coupled to a first connector of the first communication cable and having a first cable shield surrounding the first plurality of conductors, wherein the first cable shield has a first shield connector external to the first connector; and
    a second communication cable having a second plurality of conductors coupled to a second connector of the second communication cable and having a second cable shield surrounding the second plurality of conductors, wherein the second cable shield has a second shield connector external to the second connector,
    wherein the first connector is coupled to the first port, the second connector is coupled to the second port, and the first and second shield connectors are electrically coupled to one another to electrically couple the first cable shield and the second cable shield to one another.

12. The control system of claim 11, wherein the first connector is at a first end of the first communication cable and the second connector is at a second end of the second communication cable, wherein the first cable shield includes a third shield connector at a third end of the first communication cable, and wherein the third shield connector is configured to couple to a ground connection of the control system.

13. The control system of claim 12, wherein the controller is a first controller, the first communication cable includes a third connector at the third end of the first communication cable configured to couple to a third port of a second controller.

14. The control system of claim 12, wherein the second cable shield includes a fourth shield connector at a fourth end of the second communication cable, wherein the fourth shield connector is configured to couple to an additional shield connector of an additional communication cable.

15. The control system of claim 11, comprising a control panel having an enclosure, wherein the controller, the first communication cable, and the second communication cable are disposed within the enclosure.

16. The control system of claim 15, wherein the first cable shield and the second cable shield are communicatively coupled in series to a grounding point on the enclosure.

17. A control system for a heating, ventilation, and/or air conditioning (HVAC) system, comprising:
    a plurality of communication cables, each communication cable of the plurality of communication cables including a plurality of conductors extending between a first connector and a second connector and including a cable shield surrounding the plurality of conductors and extending between a first shield connector and a second shield connector that are each external to the first and second connectors, wherein the first and second connectors are each configured to couple to a respective controller port, the first and second shield connectors are each configured to electrically couple to and mechanically engage with a respective shield connector of another communication cable of the plurality of communication cables independently of the first and second connectors, and the first and second shield connectors are each independently movable relative to the first and second connectors.

18. The control system of claim 17, wherein each communication cable of the plurality of communication cables includes an external insulation layer, wherein the cable shield is disposed radially between the plurality of conductors and the external insulation layer relative to a longitudinal axis of the communication cable.

19. The control system of claim 17, comprising a plurality of controllers, each controller of the plurality of controllers having one or more controller ports, wherein each communication cable of the plurality of communication cables is coupled to one of the controller ports of one of the controllers of the plurality of controllers.

20. The control system of claim 19, comprising a control panel having an enclosure housing the plurality of controllers and the plurality of communication cables.

21. The control system of claim 20, wherein the enclosure includes a grounding point formed on a panel of the enclosure, wherein an extension of the cable shield of a first communication cable of the plurality of communication cables is conductively coupled to the grounding point, and wherein the cable shield of each communication cable of the plurality of communication cables is conductively coupled in series to the grounding point via the first communication cable.

22. The control system of claim 17, wherein the first shield connector is a male type quick-connect connector, and the second shield connector is a female type quick-connect connector.

* * * * *